Nov. 15, 1966   J. H. GREENE   3,285,159
COOKING APPARATUS
Filed Aug. 27, 1965

United States Patent Office 3,285,159
Patented Nov. 15, 1966

3,285,159
COOKING APPARATUS
John H. Greene, Box 353, Frankfort, Mich.
Filed Aug. 27, 1965, Ser. No. 483,091
1 Claim. (Cl. 99—343)

The present invention relates to food cooking apparatus and more particularly to a chicken cooking unit.

An object of the invention is to provide improved apparatus for cooking chickens.

Another object of the invention is to provide a cooking unit for preparing chickens for frying by a preliminary cooking operation.

Another object of the invention is to provide such an apparatus which will provide cooked chicken, ready for frying, which is pasteurized and may be held for longer periods under refrigeration.

Another object is to provide such an apparatus which will provide fried chicken which is more flavorful than ordinary pan-fried chicken.

Other objects, features and advantages of the invention will become apparent from the following description of an illustrative embodiment of the invention in which reference is made to the accompanying drawing, wherein, FIG. 1 is an exploded view of the complete cooking unit;

Figure 1:
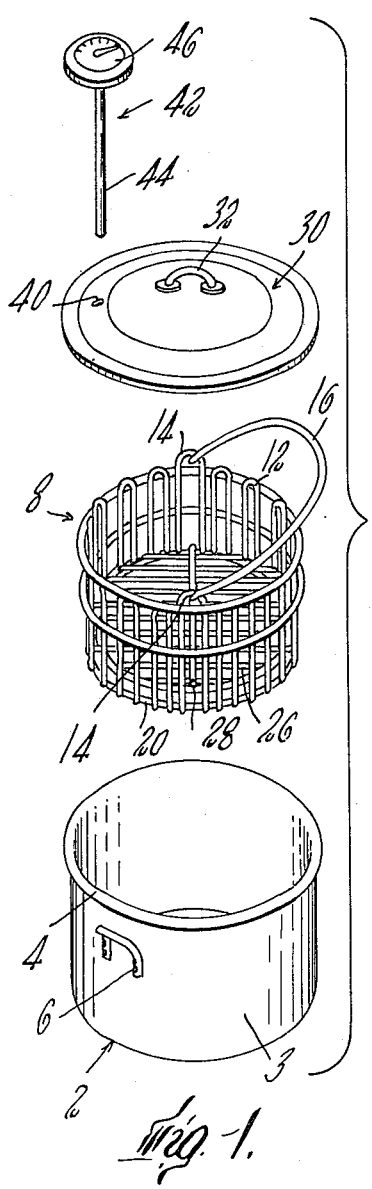
Figure 2:
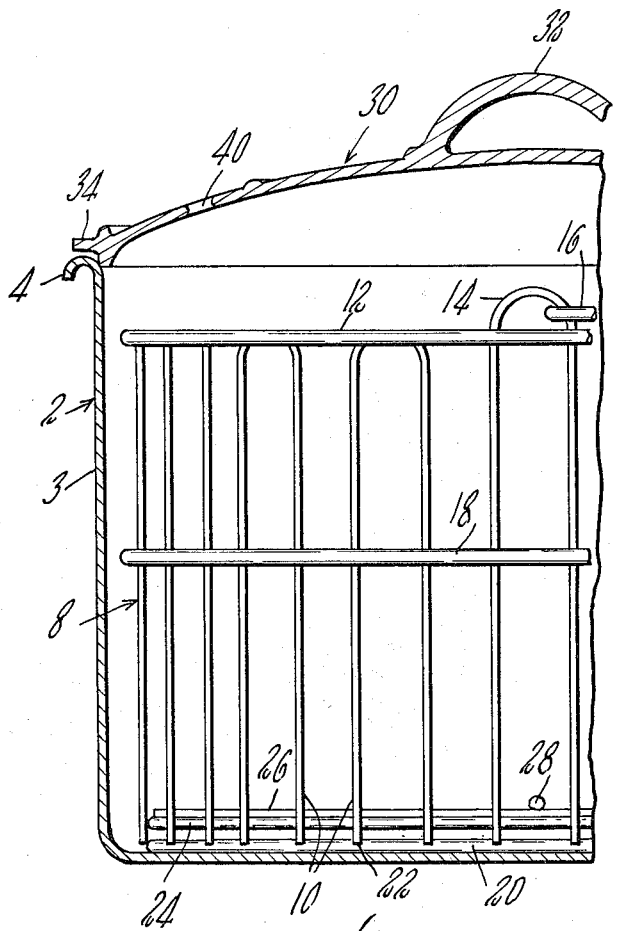
FIG. 2 is a vertical mid-sectional view of the assembled apparatus.

In general organization the cooking unit comprises an open-topped cylindrical pot of one-piece aluminum having handles attached on opposite sides, a removable open topped basket formed from metal wires welded together to provide a foraminous cylindrical side wall and a foraminous bottom, the basket being adapted to be received within the pot, and a relatively heavy lid, adapted to close the open top of the pot, and having an opening therethrough for the reception of a thermometer forming part of the unit and having a temperature sensing stem adapted to pass through the opening in the lid and be disposed within the cooking space during the cooking operation and having a temperature indicating dial visible from outside the lid when the thermometer is in operative position.

Referring to the accompanying drawings, the illustrative unit comprises a cylindrical pot 2 having an open top and a rim formed by an outwardly and downwardly curled lip 4. The body of the pot is formed in one piece of 12-gauge aluminum and typically is of 20-quart capacity. Secured to opposite sides of the pot are handles 6 permanently secured to the pot as by riveting or welding. The entire exterior surface of the pot is coated with yellow baked enamel, the inside of the pot and the upper and outer surfaces of the lip 4 not being coated.

Adapted to be disposed within the pot 2 is an open topped wire basket 8 of open-work construction formed from nickel-plated metal wires welded together. Such wires include a plurality of wires 10 formed into a U-shape and disposed with the closed end of the U upwardly and arranged in a circle. At their upper ends the wires 10 are welded to a circular wire 12, with two of the wires at opposite sides of the basket extending slightly above the wire 12 as indicated at 14 for attaching to the basket a bale-shape handle 16, also of nickel-plated metal wire looped at its opposite ends under the tops of the U-shaped wires 14, as shown. The nickel-plating is preferably a bright nickel-plating of good quality to withstand the cooking temperatures. The U-shaped wires 10 are further held in place by a circular nickel-plated metal wire loop 18 welded to them near their middles, as shown.

Further, the U-shaped wires 10 are secured together by a circular ring of nickel-plated wire 20 welded to their lower portions adjacent the ends 22. An additional circular bright nickel-plated metal wire ring 24 is welded to the inside surface of the U-shaped wires 10 as shown. A series of spaced horizontal wires 26 of bright nickel-plated metal wire are disposed parallel to each other transversely of the bottom of the basket with their ends welded to the wire ring 24. A single wire 28, of bright nickel-plated metal wire, extends transversely of the bottom of the basket at right angles to the wires 26 and overlying the same and welded thereto, forming a reinforcement for the bottom of the basket.

Figure 3:
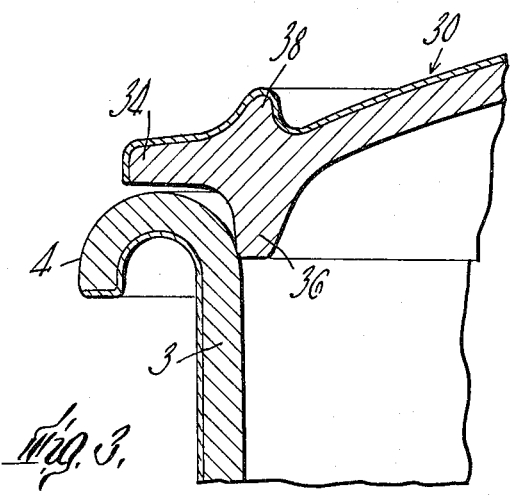
FIG. 3 is a detail vertical mid-sectional view to an enlarged scale.

The upper end of the pot is adapted to be closed during the cooking operation by a relatively heavy lid 30 which may be of iron and provided with a permanently attached handle 32 at the center of its outer surface. Around its rim, the lid 30 is provided with an outwardly extending flange 34 adapted to overlie the lip 4 of the pot, and with a downwardly extending circular rib 36 adapted to engage the inner surface of the open end of the pot as appears in FIG. 3, when the lid is in closed position. The lid further is provided adjacent its periphery with an upstanding circular rib 38 as appears to best advantage in FIG. 3. The upper surface of the lid 30, including the upper surface of the flange 34, is provided with a baked yellow enamel porcelainized finish, matching that of the exterior surface of the pot 2. Spaced inwardly from its periphery, the lid 30 is provided with an opening 40 extending entirely therethrough.

The cooking unit also includes a thermometer indicated generally at 42 having a temperature sensing stem 44 adapted to extend through the opening 40 and, when the lid is in closed position, to lie within the cooking space inside the pot 2 to sense the temperature therein. At its upper end the thermometer 42 includes a temperature indicating dial 46 which is visible from outside the cooking unit when it is in operation.

The unit described is particularly useful in cooking fried chicken preparatory to frying. The unit conveniently makes available a cooking process wherein the chickens or cut up parts, breaded if desired, are placed within the basket 8 which is then lowered into the pot 2 into which has been placed a hydrogenated shortening. The lid 30 is then closed and the thermometer 42 placed in position. A higher temperature is applied to the pot initially, preferably by a gas flame, and this is followed by a lower and constant cooking temperature just above the boiling point of water. The water content of the chicken is turned partially into steam and excess steam is permitted to escape from under the heavy weight procelainized cover, which, due to its weight, maintains a desirable cooking condition within the pot 2. The cooking operation can be conveniently controlled by observation of the thermometer 42 without opening of the unit. The cooking time depends on the size of the chicken and it may average about 40 minutes with a charge of 6 fryers. At the end of the cooking the chicken is completely done but left in the blanche-white state. The chicken is actually pasteurized whereby most of the undesirable bacteria that cause spoilage are destroyed, thus making it possible to hold the processed chicken for as much as up to 8 days under commercial refrigeration at temperatures in the vicinity of 35° F., appreciably longer than fresh chicken can be held. The restaurateur may thus prepare ahead of demand hundreds or thousands of orders many days before actual serving. The wire basket 8 is of particular convenience in the processing of cut up pieces of chicken in the cooking unit. Chicken processed as described may be prepared for serving by finish frying in a standard deep fryer for 2½ to 3 minutes. The resulting product when delivered to the customer looks like pan-fried chicken but is more tender and consistently is more flavorful than pan-fried chicken heretofore known.

I claim:

A chicken cooking unit comprising an open topped cylindrical pot of one-piece aluminum having handles attached on opposite sides thereof, an outwardly and downwardly curled lip at its upper edge, and a baked enamel coating on its outer surface only, a removable open topped basket adapted to be received within the pot formed from nickel-plated metal wires connected together and arranged and disposed to provide a foraminous cylindrical side wall and a foraminous bottom, a nickel-plated metal handle pivoted on said basket adjacent its upper edge, the wires providing said side wall including vertically extending wires connected at their tops to a first wire ring and at their bottoms to a second wire ring, and a third wire ring connected to said vertically-extending wires intermediate said first and second wire rings, and a fourth wire ring connected to and disposed inside said vertical wires above and closely adjacent to said second ring, the wires forming said bottom being connected to said fourth wire ring, a relatively heavy lid adapted to close the open top of said pot, having an opening therethrough and having a handle on its upper outside surface, and a readily removable thermometer having a temperature sensing stem adapted to pass freely through said opening in the lid and a temperature indicating dial visible from outside said lid when said stem is in position in said opening.

References Cited by the Examiner

UNITED STATES PATENTS

| | | | |
|---|---|---|---|
| 659,145 | 10/1900 | Golding | 99—418 |
| 1,295,414 | 2/1919 | Bentivegna | 99—418 |
| 1,690,418 | 11/1928 | Macomber | 220—19 |
| 2,034,057 | 3/1936 | Reuss | 204—49 |
| 2,071,817 | 2/1937 | Dean | 117—129 X |
| 2,315,475 | 3/1943 | Cobb et al. | 126—390 |
| 2,576,922 | 12/1951 | Camin | 204—49 |
| 2,932,585 | 4/1960 | Hubbell et al. | 117—129 X |

FOREIGN PATENTS

| | | |
|---|---|---|
| 64,150 | 5/1955 | France. |
| 206,087 | 10/1939 | Switzerland. |

BILLY J. WILHITE, *Primary Examiner.*